(12) United States Patent
Unger et al.

(10) Patent No.: US 10,471,795 B2
(45) Date of Patent: Nov. 12, 2019

(54) METHOD FOR COMPENSATING FOR VERTICAL MOVEMENTS

(71) Applicant: AUDI AG, Ingolstadt (DE)

(72) Inventors: Andreas Unger, Gaimersheim (DE); Christoph Göhrle, Ingolstadt (DE)

(73) Assignee: AUDI AG, Ingolstadt (DE)

(*) Notice: Subject to any disclaimer, the term of this patent is extended or adjusted under 35 U.S.C. 154(b) by 215 days.

(21) Appl. No.: 15/554,107

(22) PCT Filed: Feb. 2, 2016

(86) PCT No.: PCT/EP2016/000165
§ 371 (c)(1),
(2) Date: Aug. 28, 2017

(87) PCT Pub. No.: WO2016/134818
PCT Pub. Date: Sep. 1, 2016

(65) Prior Publication Data
US 2018/0037081 A1 Feb. 8, 2018

(30) Foreign Application Priority Data
Feb. 28, 2015 (DE) .................. 10 2015 002 595

(51) Int. Cl.
*B60G 17/0165* (2006.01)
*B60G 17/019* (2006.01)

(52) U.S. Cl.
CPC ... *B60G 17/0165* (2013.01); *B60G 17/01908* (2013.01); *B60G 2400/252* (2013.01); *B60G 2400/821* (2013.01); *B60G 2400/91* (2013.01); *B60G 2800/019* (2013.01); *B60G 2800/162* (2013.01)

(58) Field of Classification Search
CPC .......... B60G 17/0165; B60G 17/01908; B60G 2400/821; B60G 2800/162; B60G 2400/252; B60G 2400/91; B60G 2800/019
See application file for complete search history.

(56) References Cited

U.S. PATENT DOCUMENTS 4,616,848 A * 10/1986 Sugasawa et al. .......................... B60G 17/0165 280/5.518
4,770,438 A 9/1988 Sugasawa et al.
(Continued)

FOREIGN PATENT DOCUMENTS

DE 69315865 T2 7/1998
DE 102006026937 A1 1/2007
(Continued)

OTHER PUBLICATIONS

Examination Report dated Jan. 22, 2016 of corresponding German application No. 10 2015 002 595.3; 7 pgs.
(Continued)

*Primary Examiner* — Dale W Hilgendorf
(74) *Attorney, Agent, or Firm* — Maier & Maier, PLLC

(57) ABSTRACT

The invention relates to a method for compensating for vertically oriented movements of a superstructure of a vehicle. The vehicle is provided with the superstructure and with an active undercarriage having a plurality of wheels which are in contact with the carriageway, wherein each wheel is connected via an actuator adjustable over its length at a wheel assigned to a suspension point with the superstructure. Vertically oriented movements of the superstructure are caused by an inclination of the carriageway and by unevennesses of the carriageway, a first change of the length of at least one actuator is carried out for frequencies in a first, lower frequency range, and a second change of the length of the at least one actuator is carried out for frequencies in a second, higher frequency range.

21 Claims, 4 Drawing Sheets

(56) References Cited

U.S. PATENT DOCUMENTS

| | | | |
|---|---|---|---|
| 4,924,393 A * | 5/1990 | Kurosawa | B60G 2400/252 280/5.507 |
| 5,034,890 A | 7/1991 | Sugasawa et al. | |
| 5,297,045 A * | 3/1994 | Williams et al. | B60G 2400/252 280/5.507 |
| 6,176,494 B1 * | 1/2001 | Ichimaru et al. | B60G 17/0165 280/5.515 |
| 2003/0236606 A1 * | 12/2003 | Lu et al. | B60G 17/0162 701/70 |
| 2007/0276576 A1 | 11/2007 | Inoue et al. | |
| 2014/0330483 A1 | 11/2014 | Lu et al. | |
| 2015/0290995 A1 * | 10/2015 | Kanda et al. | B60G 17/016 701/37 |

FOREIGN PATENT DOCUMENTS

| | | | |
|---|---|---|---|
| DE | 102012216205 A1 | 3/2013 | |
| DE | 102012024984 A1 | 7/2013 | |
| EP | 2233332 A2 | 9/2010 | |
| GB | 2389828 A * | 12/2003 | B60G 17/162 |
| GB | 2389828 A | 12/2003 | |
| GB | 2391327 A | 2/2004 | |

OTHER PUBLICATIONS

International Search Report dated Jun. 30, 2016 of corresponding International application No. PCT/EP2016/000165; 15 pgs.

Chinese Office Action dated Dec. 24, 2018, in connection with corresponding CN Application No. 1201680012345.6 (13 pgs., including machine-generated English translation).

Notification of Transmittal of Translation of the International Preliminary Report on Patentability dated Sep. 14, 2017, in connection with corresponding International Application No. PCT/EP2016/000165 (7 pages).

Office Action dated Jul. 15, 2019, in corresponding Chinese Application No. 201680012345.6; 18 pages.

Examination report dated Jun. 28, 2019, in corresponding German Application No. 10 2015 002 595.3—including partial machine-generated English language translation; 4 pages.

* cited by examiner

METHOD FOR COMPENSATING FOR VERTICAL MOVEMENTS

FIELD

The invention relates to a method and a system for compensating for vertically oriented movements of the structure of a vehicle.

BACKGROUND

The position of a vehicle changes during a travel as a function of the inclination or location of a road on which the vehicle travels. The angles of the position of the vehicle can be detected by the sensors. In addition, the position of the vehicle is influenced by the unevennesses in the road, for example potholes and cobblestones.

A method for controlling a system of a motor vehicle is described in the document DE 10 2006 026 937. In this case, a stability index is determined. In addition, a first and a second observer is determined which will determine on the basis of operating variables of the vehicle a reference speed as well as a lateral speed from which the output lateral speed and the output longitudinal speed are determined.

A method for determining a target curve inclination of a motor vehicle when driving on a curved road is known from the document DE 10 2012 024 984 A1. In this case, the target curve inclination is detected as a function of a detected road curvature. In addition, an optical surface condition of the curved road section is also taken into consideration.

A method for processing sensor data in a motor vehicle is described in the document DE 10 2012 216 205 A1, wherein the vehicle dynamics and the chassis sensor data are detected and filtered.

The document US 2014/0330483 A1 shows an inertial sensor system provided with an active undercarriage without the combination with the controller.

SUMMARY OF THE DISCLOSURE

Against this background, a method and a system having the features described in the independent claims is presented here. Embodiments of the method and of the system are described in the dependent claims and in the description.

The method according to the invention is provided for compensating for vertically oriented movements of the superstructure of a motor vehicle. The vehicle is provided with a superstructure and with an active undercarriage with several wheels which are in contact with the carriageway, wherein each wheel is connected to the superstructure via a length-adjustable actuator at a suspension point associated with the wheel. It is further provided that vertically oriented movements of the superstructure are caused by an inclination of the carriageway and/or by unevennesses of the carriageway. According to this method, a first change of the length is carried out with at least one actuator to compensate for the inclination of the carriageway for frequencies in a first, lower frequency range which is limited by a first minimum frequency and by a first maximum frequency range, and/or a second change of the length of the at least one actuator for compensation is carried out in a second, higher frequency range for unevennesses of the carriageways which cause oscillations of the superstructure, which is limited by a second minimum frequency and a second maximum frequency.

Usually, the first maximum frequency of the lower frequency range is deeper or lower than the second minimum frequency of the higher frequency range, so that the frequency ranges are separated from each other.

As an alternative, the first maximum frequency of the lower frequency range is higher than the second minimum frequency of the higher frequency range. In this case, both frequency ranges are superimposed.

For example, with the lower frequency range, the minimum frequency is 0 Hz and the first maximum frequency is at least 0.5 Hz, the maximum is 1 Hz. With the high frequency, the second minimum frequency is at least 0.1 Hz, as a rule 0.5 Hz, with a maximum of 1 Hz, and the second maximum frequency is at least 0.1 Hz, as a rule 5 Hz, with a maximum of 20 Hz.

Further, at least one minimum frequency and/or at least one maximum frequency is applied to a corner frequency or limiting frequency of each of the actuators.

In the case of the active undercarriage, the corner frequency is generally set to 5 Hz, although a corner frequency of up to 20 Hz is possible because the superstructure is prompted by unevennesses of the carriageway with a frequency of up to the maximum of 20 Hz. The second maximum frequency usually corresponds to the usual corner frequency.

Inclinations signals are provided for compensating to each actuator in the low frequency range, and position signals are provided for compensating for unevennesses in the high frequency range, wherein the position signal in the low frequency and in the high frequency range are added with an addition module superimposed on the position signal. In this manner, the length of each actuator is changed on the basis of two superimposed changes of the length.

In an embodiment, an inclination of the superstructure is determined in at least one spatial direction, wherein a vertical distance to the associated suspension point of the superstructure is detected for at least one wheel. At the same time, an inclination of the superstructure is calculated over the at least one determined distance with a transformation of the vertical distance of the at least one wheel to the superstructure from a transformation matrix:

$$T = \begin{bmatrix} l_v & l_v & -l_h & -l_h \\ t_v & -t_v & t_h & -t_h \end{bmatrix}$$

The inclination of the carriageway in the at least one spatial direction is determined from a difference of the inclination of the superstructure in the at least one spatial direction and the inclination of the superstructure in the at least one spatial direction. Furthermore, each respective value for at least one angle $\phi_s$, $\theta_s$, by which the carriageway is inclined in at least one spatial direction is determined and a limiting value $\phi_{s,lim}$, $\theta_{s,lim}$ is preset for the value of at least one angle $\phi_s$, $\theta_s$ wherein the transmission ratios $i_{VA}$, $i_{HA}$ are applied to a distance of at least one of the wheel relative to the superstructure are taken into account. Based on this, a target value is determined for a change of the length of at least one actuators is determined as follows:

$$\vec{z}_{akt} = \text{diag}(i_{VA}, i_{VA}, i_{HA}, i_{HA}) T^T \begin{bmatrix} \phi_{s,lim} \\ \theta_{s,lim} \end{bmatrix}$$

The inclination of the superstructure is determined in the at least one spatial direction by a transformation of the vertical distance of the at least one wheel to a center of gravity of the superstructure with the transformation matrix $$T = \begin{bmatrix} l_v & l_v & -l_h & -l_h \\ t_v & -t_v & t_h & -t_h \end{bmatrix}$$

In this case, a front longitudinal distance $l_v$ describes a distance of a respective front wheel from a center of gravity of the superstructure in the spatial longitudinal direction, a rear, longitudinal distance $l_v$ describes a distance of the respective rear wheel from the center of gravity in the longitudinal spatial direction, a front, transversal distance $t_v$, describes the distance of the front wheel from the center of gravity in the transversal spatial direction, and a rear, transversal distance to describes the distance of the rear wheel from the center of gravity in the transversal spatial direction.

The transmission ratios $i_{VA}$, $i_{HA}$ are calculated over a distance of one actuator from the center of gravity of the superstructure and one wheel from the center of gravity of the superstructure.

Depending on the definition, a negative pitch angle pitch angle $\theta_s$ is determined when a ascending slope is provided, and a positive pitch angle $\theta_s$ is determined when descending slope is provided.

The respective limiting value $\phi_{s,lim}$, $\theta_{s,lim}$ is preset for the value of at least one angle $\phi_s$, $\theta_s$ with $$\phi_{s,lim} = \begin{cases} \phi_{s,max} wenn \phi_s > \phi_{s,max} \\ \phi_{s,min} wenn \phi_s < \phi_{s,min} \\ \phi_s sonst \end{cases}$$

$$\theta_{s,lim} = \begin{cases} \theta_{s,max} wenn \theta_s > \theta_{s,max} \\ \theta_{s,min} wenn \theta_s < \theta_{s,min} \\ \theta_s sonst \end{cases}$$

[$wenn$ = when, $sonst$ = oherwise]

In addition, it is possible to select an amount of $\theta_{s,min}$ in the case of ascending slope which is greater than an amount of $\theta_{s,max}$ in the case of descending slope.

In order to determine the inclination of the superstructure, a first, superstructure coordinate system which is fixed to the superstructure is used for the determination of the inclination of the undercarriage, and a second system which is fixed to the undercarriage is used for the determination of the inclination of the undercarriage. A third, inertial coordinate system is used as a reference coordinate system which is related to gravitational force.

Furthermore, the inclination of the superstructure relative to the reference coordinate system is described with a quaternion.

In a configuration, a strapdown algorithm is used, wherein it is provided that in order to determine a corrected acceleration of the vehicle, an acceleration measured by the vehicle sensor is corrected with the centrifugal acceleration and the gravitational acceleration and the speed of the vehicle is obtained from that in one plane. In addition, the inclination of the superstructure is calculated.

Vibrations of the superstructure, which occur when driving over the unevennesses, are compensated for with an algorithm for a continuous damping control, in particular with a so-called skyhook algorithm, in the second, high frequency range.

The skyhook algorithm or a skyhook function is based on a targeted damping of the superstructure of the motor vehicle with a virtual damper, which has a damping constant $d_{sky}$. In order to convert the skyhook function, an acceleration of the superstructure is determined in the vertical direction as an operating parameter, which is integrated over time and filtered.

In this case, a speed of the superstructure is calculated in the vertical direction and by impacting the actuators with the skyhook function, a force that is proportional to the speed of the superstructure is provided as an actuating variable which is oriented in the vertical direction. An effect resulting from the skyhook function is provided for the virtual damper which is connected to an inertial reference system, for example the sky, which is why the function is referred to as "skyhook" as the superstructure of the motor vehicle seems to float when the vehicle is travelling on a carriageway that is constructed as a road.

The system according to the invention is designed to compensate for an inclination of a motor vehicle in at least one direction, wherein the vehicle is provided with a superstructure and with an active undercarriage having several wheels that are in contact with the carriageway. The system is provided with a plurality of sensors and with a control device, wherein each wheel is connected via an actuator that is adjustable in its length to a suspension point associated with the wheel. Vertically oriented movements of the superstructure are caused by an inclination of the carriageway and/or by the unevennesses of the carriageway. The control device is designed to provide actuating signals for the actuators and to control their length, wherein a first change of the length of at least one of the actuators for compensating for the inclination of the carriageway is carried out for frequencies in a first, lower frequency range, which is limited by a first minimum frequency and by a first minimum frequency, and/or wherein a second change of the length of the at least one actuator for compensating for unevennesses of the carriageway for frequencies in a second, higher frequency range is limited by a second minimum frequency and by a second maximum frequency.

In a configuration of the system it is provided that a first sensor is designed to determine an inclination of the superstructure in at least one spatial direction, wherein at least one second sensor is designed to detect at least one wheel with a vertical distance to the suspension point of the superstructure which has been assigned to it. The control device is configured to calculate over the at least one determined distance an inclination of the undercarriage in the at least one spatial direction with the transformation of the vertical distance of the at least one wheel to the superstructure with a transformation matrix $$T = \begin{bmatrix} l_v & l_v & -l_h & -l_h \\ t_v & -t_v & t_h & -t_h \end{bmatrix}$$

The control device is further configured to determine the inclination of the carriageway in the at least one spatial direction from a different of the inclinations of the carriageway in the at least one spatial direction and the inclination of the undercarriage in the at least one spatial direction, and to determine respectively a value for at least an angle $\phi_s$, $\theta_s$ about which the carriage way is inclined in at least one spatial direction. Each respective limiting value $\phi_{s,lim}$, $\theta_{s,lim}$ is or will be preset for the at least one angle $\phi_s$, $\theta_s$. The control device is further configured to take into account transmission ratios $i_{VA}$, $i_{HA}$ for a distance of at least one wheel relative to the superstructure, wherein the control device is designed to determine at least one target value for a change of a length of at least one actuator according to the formula $$\vec{z_{akt}} = \text{diag}(i_{VA}, i_{VA}, i_{HA}, i_{HA}) T^T \begin{bmatrix} \phi_{s,lim} \\ \theta_{s,lim} \end{bmatrix}$$

The at least one second sensor is designed as a distance sensor.

The control device is provided with a horizontal leveling regulator having a low-pass filter, which is designed to provide control signal to the respective actuators in the lower frequency range. As an alternative, the low-pass filter can be connected downstream of the horizontal leveling regulator.

In addition, the control signal is provided with a basic controller designed to provide actuating signals in the high frequency range for the respective actuators. The control device can be also provided with a predictive controller having a bandpass filter which is designed to provide actuating signals in the high frequency range.

In an alternative embodiment, it is also possible to provide the control device also with a basic controller and/or with a predictive controller which is connected downstream.

Regardless of whether a respective combination of a named controller is provided with a low-pass filter or with a bandpass filter, which is regardless of whether it is a low-pass filter or a bandpass filter is integrated in the respective controller or connected downstream of it, both the low-pass filter or the bandpass filter are designed to provide frequency-dependent actuating signals.

With the method and the system according to this invention, the actuators of the active undercarriages are combined with a function for active vibration damping to compensate for the unevenneses of the carriageway.

In one configuration, the horizontal level actuator of the superstructure is combined with the basic regulator and when appropriate it is also complemented with the predictive controller of the active undercarriage, by means of which the vibration damping is to be implemented.

With the active undercarriage, the superstructure of the motor vehicle is oriented for horizontal leveling relative to the field of gravity and thus to oriented it horizontally. In addition, vibrations should be actively damped with the active undercarriage. With the method according to the invention, a dynamic conduct of the motor vehicle, which is caused by the oscillations of the superstructure in vertical direction due to unevennesses of the carriageway, as well as by the inclination of the carriageway, are to be compensated for.

In carrying out the method, the actuators of the active undercarriage are connected via the wheel to the superstructure of the vehicle, while they are at the same time also used for active damping of oscillations and for horizontal leveling of the superstructure. Actuating signals are provided in order to control and thus to manage and/or regulate a length and/or a change of the length of a respective actuator via a signal filter, wherein via a length of an actuator, the distance of each wheel which is connected to this actuator with the superstructure is dynamically adjusted to the superstructure. In this case it is provided within the scope of the of the method that the respective usable frequency ranges for the damping of oscillations on the one hand and the horizontal leveling on the other hand are separated with suitable filters. This makes it possible to avoid in this manner mutual negative influencing of the actuating signals thanks to the frequency-selective separation of the actuating signals that is provided for the adjustment of the actuators. Usually, the different actuating signals are added from both provided frequency ranges.

In one configuration, a low-frequency actuating signal is provided for the horizontal leveling of the superstructure, wherein the length of a respective actuator is adjusted with a correspondingly low frequency to the inclination of the road, and wherein the inclination of the road is as a rule also changed with a lower frequency which is usually even lower than a frequency of the frequency range that is used for horizontal leveling with the superstructure. A high frequency actuating signal is provided for compensating for those oscillations of the superstructure that are caused by the unevennesses of the carriageway or by potholes or cobblestones, wherein a surface of the street is as a rule also changed with the high frequency. A length of a respective actuator is according to the configuration changed with two superimposed, frequency-dependent correction values used to change the lengths that are superimposed on each other. In this case, the length is to be corrected with a first correction value for compensating for the inclination of the carriageway with the lower frequency of the lower frequency range, and with a second correction value for compensating for the unevennesses of the carriageway with the higher frequency of the higher frequency range.

If the inclination of the carriageway is compensated for with the active undercarriage, the superstructure is oriented toward the coordinate system or reference system, wherein the actuating variables are calculated for the actuators from the angles $\phi_s$ and $\theta_s$, as well as from the transformation matrix T. The superstructure thus remains always horizontally leveled independently of the inclination of the carriageway.

When controlling the active undercarriage, other functions are also taken into account in addition to horizontal leveling. In this case, the horizontal leveling is implemented in a low frequency range through static range by means of the horizontal controller, while the functions in a higher frequency dynamic range are used for compensating for unevenesses of the carriageway by the basic controller and optionally the predictive controller.

The vibrations occurring when driving over unevennesses of the carriageway are actively damped with the basic controller, wherein for example a skyhook algorithm is used in order to reduce vertical movements of the superstructure. In addition, the predictive controller should be also used by means of which the unevennesses are proactively or predictively compensated for. However, any other controller can be also employed by means of which a dynamic behavior of the superstructure is to be influenced. Usually, at least one controller, for example the basic and/or the predictive controller is used in a frequency range from approximately 0.5 Hz and more to regulate oscillations that are relevant to the superstructure and to the wheels, which are caused by unevennesses of the carriageway.

The horizontal leveling should be on the other hand used only in the frequency range between 0 Hz (in the static range) up to approximately 0.5 Hz (in the low-frequency range). The superstructure of the vehicle is thus oriented only toward terrain-dependent inclines or slopes that are induced by ground waves, which is carried out by the basic or predictive regulator.

For this purpose, actuating signals to be provided by said controllers are filtered for controlling the actuators, wherein with the horizontal leveling, low-pass filtering is used with a corner frequency of for example 0.5 Hz. The actuating signals for controlling the actuators, which are provided by the predictive controller and when appropriate by the basic control, are conditioned via a bandpass filter at the frequency range between approximately 0.5 Hz up to for example 5 Hz. The upper limit is in this case to be adjusted to a corner frequency of the respective actuator of the active undercarriage.

The corner frequencies of the actuators are in one variant slightly varied, so that for example a smaller overlapping range of both frequency ranges which is to be taken into account can be also created. So for example, it is conceivable that the corner frequency of the low-pass filter is increased to approximately 1 Hz for horizontal leveling, while the lower limit of the bandpass filter can be adjusted for example for the predictive controller to approximately 0.5 Hz. In this manner, the edge effects that are due to phase distortions in the range of the corner frequencies can be minimized.

For arbitration or estimation, the actuating signals of the individual controllers are subsequently added since a mutually disadvantageous influencing of the actuating signals can be excluded by filtering.

BRIEF DESCRIPTION OF THE DRAWING

Further advantages and embodiments of the invention will become apparent from the description and from the attached figures.

It goes without saying that the features mentioned above and those that will be explained below can be used not only in the respectively mentioned combination, but also in other combinations or alone, without deviating from the scope of the present invention.

Figure 1:
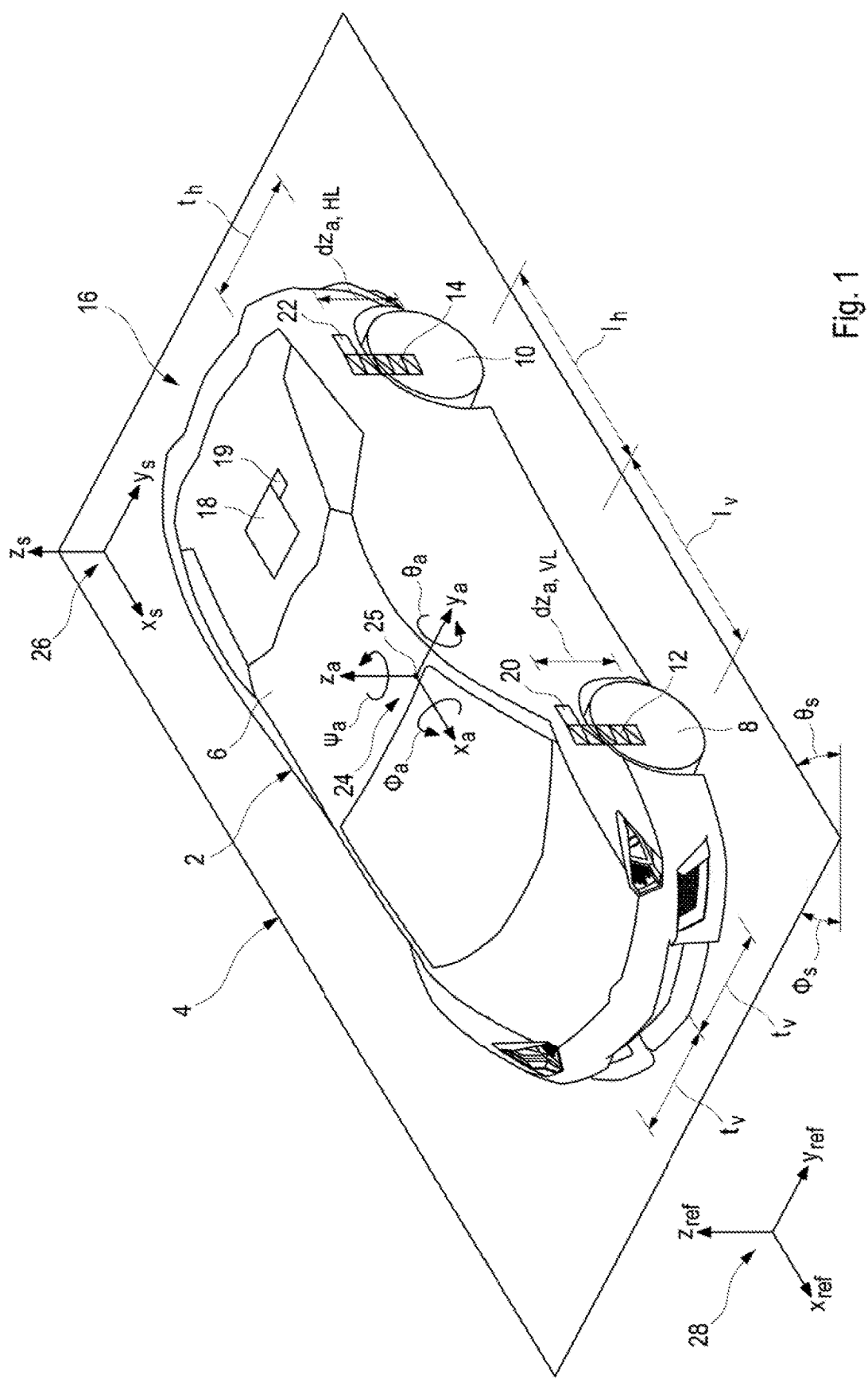

The invention is further described based on its embodiments that are schematically illustrated in the drawings and it will now be described in detail with reference to schematic illustrations provided in the drawings.

FIG. 1 shows a schematic representation of an example of a vehicle that is provided with an embodiment of the system according to the invention.

Figure 2:
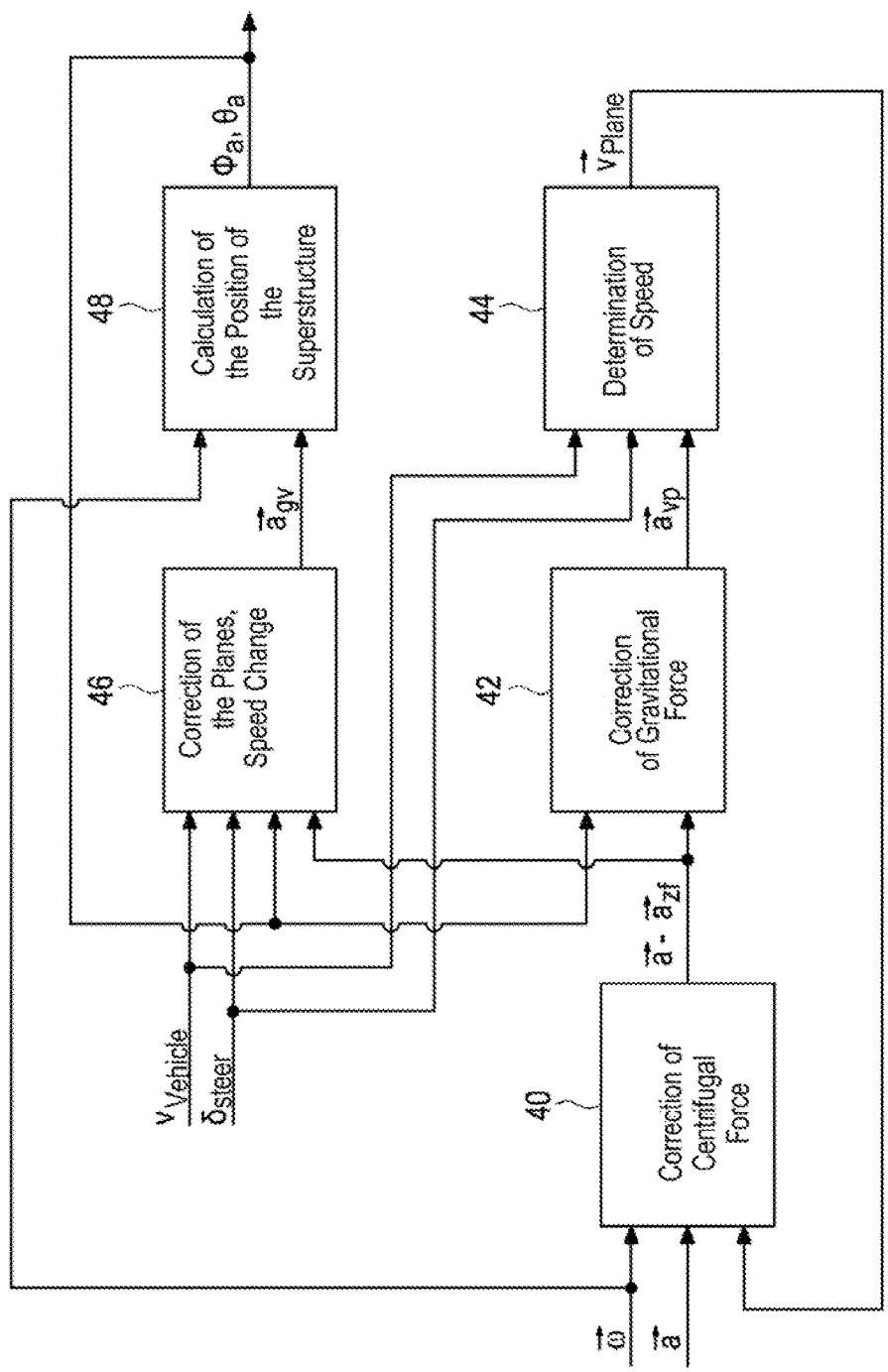

FIG. 2 shows a diagram of an embodiment of the method according to the invention.

Figure 3:
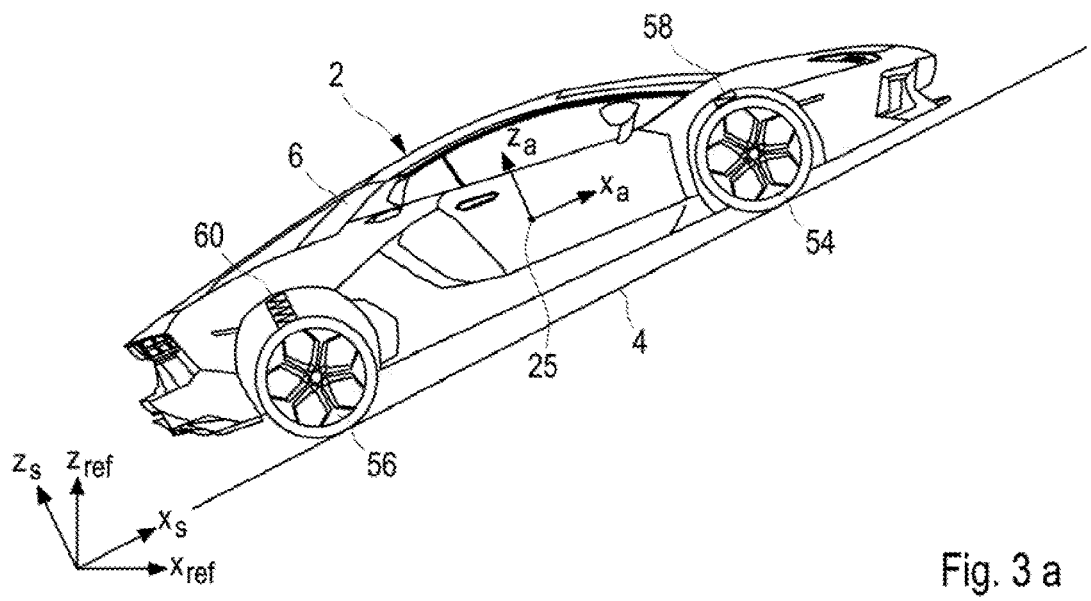
Figure 3:
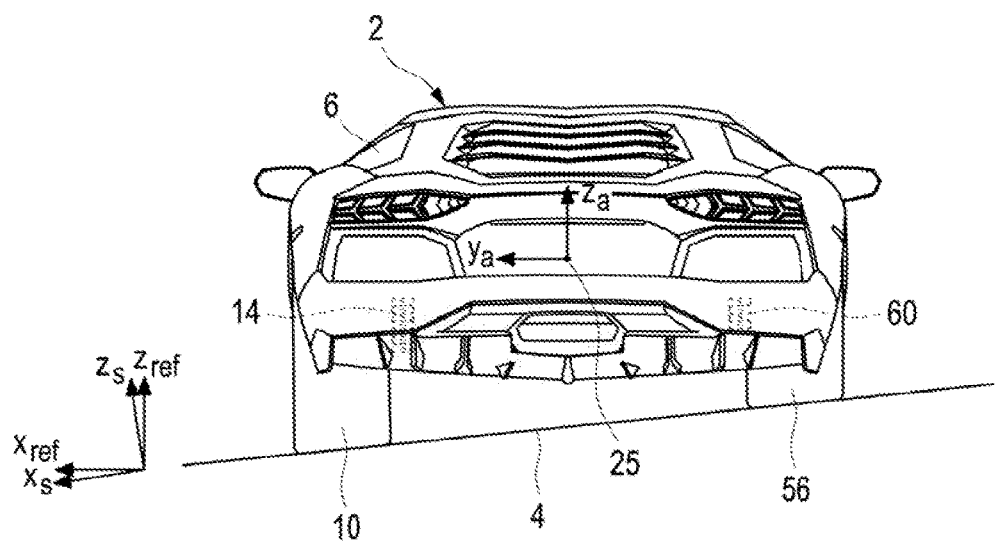

FIG. 3 shows the vehicle of FIG. 1 with different variants of the embodiment of the method according to the invention.

Figure 4:
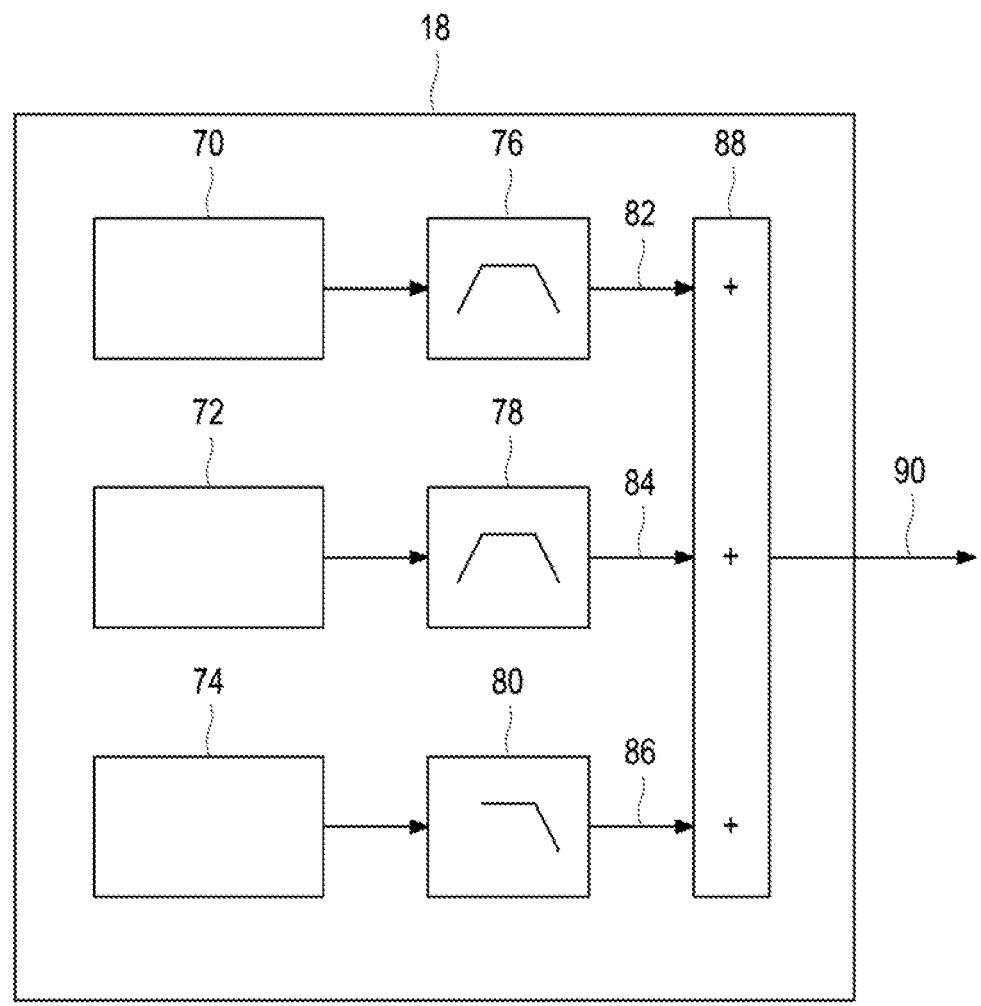

FIG. 4 shows in a schematic representation a detail of a control device of the system according to the invention.

The figures are described in a contiguous and interconnected manner, the same components are labeled with the same reference numerals.

DETAILED DESCRIPTION OF THE DRAWING

FIG. 1 shows a vehicle 2 that is constructed as a motor vehicle and a road that is constructed as carriageway 4 on which the vehicle 2 is moved during its travel in a schematic representation. In this case, the vehicle 2 comprises a superstructure 6 and four wheels 8, 10 which provided for the progression of the vehicle 2, of which only a front left wheel 8 and a rear wheel 10 are shown in FIG. 1. Each of the wheels 8, 10 is connected via at least one active actuator 12, 14 to the superstructure 6, wherein the wheels 8, 10 and the actuators 12, 14 are constructed as components of an active undercarriage of the vehicle 2.

The embodiment of the system 16 according to the invention comprises as components a control device 18, at least one sensor 19 for determining the inclination of the superstructure 6, as well as a plurality of second sensors, designed in this case as four distance sensors 20, 22, of which only two sensors are illustrated in FIG. 1, wherein one such a distance sensor is associated with each of the wheels 8, 10. The at least one first sensor 19 and the distance sensors 20, 22 are at the same time constructed as components of a sensor arrangement of the system 16. Furthermore, the sensor arrangement and thus also the system 16 comprise sensors, not shown in the figures, that are used for determining, as a rule by measuring, at least one kinematic variable, usually a speed and/or acceleration of the vehicle 2 and/or of the superstructure 6.

The following embodiment of the method of this invention described with reference to the diagram of FIG. 2, as a method to be carried out with the system 16 of the embodiment illustrated in FIG. 1, wherein the steps of the embodiment of the method are to be controlled by the control device 18 and thus controlled and/or regulated.

In addition, FIG. 1 shows three coordinate systems 24, 26, 28, as well as diverse parameters, which are here illustrated as geometrical parameters.

In this case, a first coordinate system 24 is attached in a fixed manner to the superstructure 6 of the vehicle 2 so that it lies in the center of gravity of the superstructure 6. The first coordinate system 24 comprises a first axis $x_a$, which is oriented longitudinally relative to the superstructure 6 and parallel to a direction of travel of the vehicle 2. A second axis is oriented in the spatial direction $y_a$ which is transversal to the superstructure 6 and parallel to the axes of the vehicle 2, which extend between the respective two wheels 8, 10 of the vehicle 2.

A third axle is oriented in the spatial direction $z_a$ parallel to a vertical axis of the superstructure 6. All three named axes and thus also the spatial directions $x_a$, $y_a$, $z_a$ are oriented perpendicularly to each other. In this embodiment, both first-mentioned axes and thus also the spatial directions $x_a$, $y_a$, $z_a$ span a horizontal plane of the vehicle 2 in which lies the center of gravity 25.

Furthermore, FIG. 1 shows two examples of vertically oriented distances $dz_{a,VL}$, $d_{za,HL}$. A first distance $dz_{a,VL}$ relates to a distance between the front left wheel 8 of the superstructure 8. A second distance $d_{za,HL}$ relates to a distance between the rear left wheel 10 and the superstructure 6. These distances $dz_{a,HL}$, $dz_{a,HL}$ are oriented along the actuators 12, 14 and they can be detected by the distance sensors 20, 22 assigned to the wheels 8, 10.

The distances of the wheels 8, 10 to the center of gravity 25 of the superstructure 6 in a plane parallel to the horizontal plane are to be defined here over the lengths or side lengths or distances $t_v$, $t_h$, $I_h$, $I_v$. In this case, for the front left wheel 8 is to be taken into account a front, transversal distance $t_v$, which describes the distance of the wheel 8 from the center of gravity 25 in the transversal spatial direction, as well as a front, longitudinal distance $I_v$, which describes the distance of the wheel 8 from the center of gravity 25 in the longitudinal spatial direction. For the rear left wheel 10 are to be taken into consideration a transversal distance $t_h$, which describes the distance of the wheel 10 from the center of gravity 25 in the transversal spatial direction, and a rear, longitudinal distance $I_h$, which describes the distance of the wheel 10 from the center of gravity 25 in the longitudinal spatial direction.

Another vertically oriented distance $dz_{a,VR}$ relates to a distance between a front right wheel, not shown here, and the superstructure 6.

An additional distance $dz_{a,HR}$ in the vertical direction relates to a distance between a rear right wheel, not shown here, and the superstructure 6. The described distances $dz_{a,VR}$, $dz_{a,HL}$, $dz_{a,HR}$, $dz_{a,VL}$ or the distances between the wheels 8, 10 and the superstructure 6 are related to the horizontal plane in which the center of gravity 25 is located.

Furthermore, for the front right wheel is to be taken into consideration the transversal distance $t_v$, which describes the distance of the right front wheel from the center of gravity in the transversal spatial direction, and the front, longitudinal distance $l_v$, which describes the distance of the front right wheel from the center of gravity 25 in the longitudinal spatial direction. For the rear right wheel are to be taken into account the transversal distance $t_h$, which describes the distance of this wheel from the point of gravity 25 in the transversal spatial direction, and the rear, longitudinal distance $l_h$, which describes the distance of the rear right wheel from the center of gravity 25 in the longitudinal spatial direction, while in FIG. 1 is not indicated the rear, transversal distance that is to be taken into consideration for the rear right wheel.

A second, coordinate system 26 that is fixed to the undercarriage is associated with the carriageway 4 and comprises a first axis in spatial direction $x_s$ parallel to a given direction of travel or longitudinal direction of the carriageway 4, a second axis in spatial direction $y_s$, which is oriented parallel to a transverse direction of the carriageway 4, and a third spatial direction $z_s$, wherein all the mentioned axis are oriented perpendicularly to each other. An inclination and thus a position of the carriageway 4 is here described on the basis of a transverse angle or roll angle $\phi_s$, which describes an inclination of the carriageway 4 in the transverse direction, and on the basis of a longitudinal angle or pitch angle $\theta_s$, which describes an inclination of the carriageway 4 in the longitudinal direction and thus the gradient or the slope.

A third coordinate system is designed as a reference coordinate system and comprises a first axis in spatial direction $x_{ref}$, a second axis in spatial direction $y_{ref}$ and a third axis in spatial direction $z_{ref}$, all of which are oriented perpendicularly to one another.

In addition, a pitch winkle $\phi_a$, which describes the first axis oriented in spatial direction $x_a$, is assigned to the first coordinate system 24 of the superstructure 6, a pitch angle $\theta_a$ describes a rotation of the superstructure 6 about the second axis oriented in space direction $y_a$, and a yaw angle $\psi_a$ describes a rotation of the superstructure 6 about a third axis oriented in the spatial direction $z_a$.

The first coordinate system 24 which is fixed to the superstructure $[x_a, y_a, z_a]$ follows in the center of gravity 25 of the superstructure 6 of the vehicle 2 the translational and rotational movements of the superstructure 6. The third, inertial coordinate system $[x_{ref}, y_{ref}, z_{ref}]$ is used as a reference coordinate system, wherein it is taken into account that the gravitational acceleration g acts exclusively in the spatial direction $Z_{ref}$ parallel to a gravitational vector.

In the embodiment of the method, the pitch angle $\theta_s$ and the roll angle $\phi_s$ are applied to the third coordinate system 28 which is designed as a reference system for estimating an inclination or position of the superstructure 6.

The angles $[\theta_a, \phi_a, \psi_a]$ included between the coordinate system 24 which is fixed to the superstructure are described also as an inertial roll angle $\theta_a$ that is included in the inertial coordinate reference system 28, and as inertial roll angle $\phi_a$ and inertial yaw angle $\psi_a$. Their orientation in the pitch direction and in the yaw direction is referred as an inclination of the superstructure 6 determining the pitch angle $\theta_a$ and yaw angle $\phi_a$.

In order to estimate the inclination of the superstructure 6, the accelerations $\vec{a} = [\ddot{X}_a, \ddot{Y}_a, \ddot{Z}_a]^T$ of the superstructure 6 or of the vehicle 2 are measured along the spatial directions $x_a$, $y_a$, $z_a$ and the rotational rates $\vec{\omega} = [\dot{\psi}_a, \dot{\phi}_a, \dot{\Theta}_a]^T$ are measured with the sensor arrangement to determine the inertia with six degrees of freedom (IMU—Inertial Measurement Unit) and are thus determined, wherein the sensor arrangement can be used also independently of the carrying out of the method in the vehicle 2.

In order to estimate the inclination of the superstructure 6, it is first necessary to take into account to which physical boundary conditions is the system exposed, which are determined by the sensor arrangement or by measuring the variables $\vec{a}$ and $\vec{\omega}$ to be determined. From the measured signals of the acceleration signals of the acceleration sensors of the sensor arrangement, three different physical variables are determined:

the centrifugal acceleration which is dependent on the rotational rates $\vec{\omega}$ and the planar speed $\vec{v}_{Ebene} = [v_{Ebene,x}, v_{Ebene,y}, v_{Ebene,z}]^T$ of the vehicle 2

$$\vec{a}_{zf} = \vec{\omega} \times \vec{v}_{Ebene} \quad (3)$$

the change in the adjusted, planar speed $\vec{v}_{Ebene}$ and thus the acceleration $\vec{a}_{vp}$ of the vehicle 2 and/or of the superstructure 6 in the spatial direction of an axis of a respective acceleration sensor in the horizontal plane of the vehicle:

$$\vec{a}_{vp} = R\dot{\vec{v}}_{Ebene} \quad (4)$$

the gravitational acceleration $\vec{a}_{gv} = R[0,0,-g]^T \quad (5)$

In the formulas above, $\vec{v}_{Ebene}$ is the speed of the vehicle 2 in the horizontal plane and R is the Euler torque matrix (6), which is calculated by taking into account the Eulerian angles in a rotational sequence of the roll angle $\phi$, the pitch angle $\theta$ and the yaw angle $\psi$. In this case, $v_{Ebene,x}$ is the usual speed of the vehicle $v_{Fzg}$ in the longitudinal direction of the vehicle 2, which is measured via the rotationals speed of the wheels 8, 10 and displayed on the tachometer.

$$R = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\cos\psi - \sin\phi\cos\psi & \cos\phi\cos\theta \end{pmatrix} \quad (6)$$

The respective angles to be determined $\phi$, which is to say $\phi_a$ (for the superstructure), $\phi_s$ (for the carriageway) and $\theta$, which is to say $\theta_a$ (for the superstructure) and $\theta_s$ (for the carriageway), can be usually determined with different calculation methods and different approaches to the calculation:

by temporarily integrating the rotational rates measured with the sensor arrangement, or by eliminating the centrifugal acceleration $\vec{a}_{zf}$ and by changing the planar speed $\vec{V}_{Ebene}$ and thus the acceleration $\vec{a}_{vp}$ of the vehicle 2 from the acceleration, measured by the sensor arrangement, $\vec{a}_{gv} = \vec{a} - \vec{a}_{zf} - \vec{a}_{vp}$ and calculating the angle via trigonometric function $$\theta_a = \operatorname{atan}\frac{a_{gv,x}}{a_{gv,z}},$$

$$\phi_a = \operatorname{atan}\frac{a_{gv,y}}{a_{gv,z}}.$$

As was already indicated by Equation 5, $\vec{a}_{gv}$ is a vector with the three elements $[a_{gv,x}, a_{gv,y}, a_{gv,z}]^T = [g^*\sin\theta, -g^*\sin\phi^*\cos\theta^*\cos\phi^*\cos\theta]^T$, wherein the gravitational acceleration $g = 9.81$ ms$^2$ is used here as a scalar because depending on the inclination of the superstructure 6 which is described with the Euler torque R (6), the effect is exerted on different elements of the vector $\vec{a}_{gv}$. When the superstructure 6 is not inclined, then $\vec{a}_{gv} = [0,0,-g]^T$. When a roll angle $\phi_a = 90°$ and a pitch angle $\theta_a = 0°$, then $\vec{a}_{gv} = [0, -g, 0]^T$. If $\vec{a}_{gv}$ is known, the pitch angle $\theta_a$ and the roll angle $\phi_a$ can be calculated via the arctan functions described above.

However, while carrying out the calculations, it must be taken into account that an integration of the rotational or stationary data is inaccurate due to time-variable offset errors of the rotation rate sensors. This means that the calculated angles drift toward low frequency and only high-frequency components of the measured signals can be used. On the other hand, high-frequency disturbances are to be expected in the case of the angles that were determined by the acceleration sensors because speed changes that are difficult to detect, which occur for example when driving over potholes, cannot be eliminated from the measured signal.

In the embodiment described here, quaternion-based inclination filters or position filters were used. However, it is also possible to use a Kalman filter for a fusion of both calculation methods. In this manner, both calculations mentioned above are combined, wherein a signal is provided which can be used both for a low frequency and for a high frequency.

A quaternion is a four-dimensional vector $\vec{q} = [q_1, q_2, q_3, q_4]^T$ by means of which the orientation of a rigid body, which is here the superstructure 6, is to be described. If a rigid body is rotated by the angle $\chi$ $\alpha$ about the axis $\vec{r} = [r_x, r_y, r_z]^T$ with respect to a reference system, wherein $\vec{r}$ is a unit vector, this orientation is described relative to the reference system by the quaternation $$\vec{q} = \left[\cos\frac{X}{2}, -r_x\sin\frac{X}{2}, -r_y\sin\frac{X}{2}, -r_z\sin\frac{X}{2}\right]^T$$

This is first used for a temporal integration of the rotational data measured by the sensor arrangement, wherein the superstructure 6 is rotated with respect to the inertial reference system with the rotation rate $\vec{\omega} = [\omega_x, \omega_y, \omega_z]^T$. Based on an initial position $\vec{q}_L$ of the superstructure 6, the change of the position or of the inclination is described based on the rotation rate by the equation (7):

$$\vec{q}_\omega = \frac{1}{2}\vec{q}_L \otimes [0, \omega_x, \omega_y, \omega_z] \tag{7}$$

The operator $\otimes$ symbolizes here a quaternion multiplication. In a time-discrete case, a resulting differential equation can be resolved for example with a Euler integration (8):

$$\vec{q}_{\omega,k} = \vec{q}_{L,k-1} + \vec{\dot{q}}_\omega \Delta t \tag{8}$$

wherein $\Delta t$ corresponds to a step width between two points in time k and k−1.

In order to describe an orientation of the superstructure 6 from the acceleration $\vec{a}$ measured by the sensor arrangement and to describe the resulting purified gravitational acceleration $$\vec{a}_{gv} = [a_{gv,x}, a_{gv,y}, a_{gv,z}]^T = [g^*\sin\theta, -g^*\sin\phi^*\cos\theta, -g^*\cos\phi^*\cos\theta]^T$$

with quaternion, the following optimization problem needs to be solved (9):

$$\vec{q}_a = \tag{9}$$

$$\min_{q_L \in \mathbb{R}^4} \vec{f}(\vec{q}_L, \vec{a}_{gv}) \cdot \operatorname{mit} \vec{f}(\vec{q}_L, \vec{a}_{gv}) = \begin{bmatrix} 2(q_{L,2}q_{a,4} - q_{L,1}q_{L,3}) - a_{gv,x} \\ 2(q_{L,1}q_{L,2} + q_{L,3}q_{L,4}) - a_{gv,y} \\ 2(0,5 - q_{L,2}^2 - q_{L,3}^2) - a_{gv,z} \end{bmatrix}$$

A direct calculation of the inclination is not possible because there is an infinite number of solutions for an axis of rotation which is oriented parallel to the gravitation vector. For a time-discrete solution of the optimization problem can be used a gradient-based approach (10):

$$\vec{q}_{a,k} = \vec{q}_{L,k-1} - \mu \frac{\nabla \vec{f}(\vec{q}_{L,k-1}, \vec{a}_{gv})}{\|\nabla \vec{f}(\vec{q}_{L,k-1}, \vec{a}_{gv})\|} \tag{10}$$

with an adjustable step width $\mu$.

In order to fuse the information about the inclination which results from the measured rotation rates $\vec{q}_{\omega,k}$ and from the accelerations $\vec{q}_{a,k}$ r, both quaternions are weighted by the Equation (11):

$$\vec{q}_{L,k} = \gamma \vec{q}_{a,k} + (1-\gamma)\vec{q}_{\omega,k} \tag{11}$$

wherein $0 \leq \gamma \leq 1$ is an adjustable parameter. The pitch angle and the roll angle are calculated with the equations (12a), (12b):

$$\theta_{a,k} = -\sin^{-1}(2q_{L,k,2}q_{L,k,4} + q_{L,k,1}q_{L,k,3}) \tag{12a}$$

$$\phi_{a,k} = \operatorname{atan}\left(\frac{2q_{L,k,3}q_{L,k,4} - 2q_{L,k,1}q_{L,k,2}}{2q_{L,k,1}^2 + 2q_{L,k,4}^2 - 1}\right) \tag{12b}$$

In order to eliminate the centrifugal acceleration $\vec{a}_{zf}$ and the change $\vec{a}_{vp}$ of the planar speed $\vec{v}_{Ebene}$ from the accelerations measured by the sensor arrangement, the pitch and roll angle must be taken into account, which are gain calculated with the aid of the gravitational acceleration vector $\vec{a}_{gv}$.

In order to carry out the embodiment of the method, a so-called strapdown approach is used, which is illustrated in the diagram of FIG. 2. Individual steps 40, 42, 44, 46, 48 of the method will be described next in more detail.

At the beginning of the method, the value of the acceleration $\vec{a}$ and of the rotation rate $\vec{\omega}$ that have been determined by the sensors are provided. With these values is in a first step 40 carried out a "correction of the centrifugal force", wherein the accelerations measured by the sensor arrangements are corrected by the centrifugal force component $\vec{a}_{zf} = \vec{\omega} \times \vec{V}_{Ebene}$. A first corrected acceleration $\vec{a} - \vec{a}_{zf}$ is thus determined. This first corrected $\vec{a} - \vec{a}_{zf}$ acceleration is then corrected while taking into consideration the values for the roll angle $\phi_a$ and the pitch angle $\theta_a$ in a second step 42, while carrying out a "correction of the gravitational force" with the gravitational acceleration $\vec{a}_{gv}$ resulting in acceleration $\vec{a}_{vp}$ on the horizontal plane.

Two possibilities are provided within the scope of the method to calculate the speed $\vec{v}_{Ebene}$.

A "determination of the speeds" is carried out in a third step 44 while taking into consideration acceleration $\vec{a}_{vp}$ of the vehicle 2, the measured speed v of the vehicle 2, and the steering angle $\delta_{lenk}$, wherein the first planar speed of the vehicle $\vec{v}_{Int} = [v_{Int,x}, v_{Int,y}, v_{Int,z}]^T$ is calculated with the integration (13):

$$\vec{v}_{Int} = \int \vec{a}_{vp} dt \quad (13)$$

of the acceleration $\vec{a}_{vp}$ of the vehicle 2 and it is thus determined in this manner. This planar speed $\vec{v}_{Int}$ is then used again in a closed control circuit for a "correction of the centrifugal force" in a first step 40.

For the speed $v_{Ebene,x}$ in the spatial direction of a longitudinal axis of the vehicle 2 can be in this case used the measured speed $v_{Fzg}$ of the vehicle 2. With the aid of a single-track model, it is further also possible to calculate from the steering angle $\delta_{lenk}$ and from the measured speed $v_{Fz}$ the effective speed $v_{y,ESM}$ for the transverse axis of the vehicle. No further measurement or calculation is available for the vertical speed $v_{Ebene,z}$. The alternatively obtained second planar speed of the vehicle (14):

$$\vec{v}_{alt} = [V_{Fzg}, V_{y,ESM}, 0]^T \quad (14)$$

and the speed $\vec{v}_{Int}$ calculated with the integration (13) can be fused by means of a suitable algorithm such as for example with a Kalman filter (15) and with a calculation rule including a weighting factor $\tau$:

$$\vec{v}_{Ebene} = \tau \vec{v}_{Int} + (1-\tau) \vec{v}_{alt}, mit\, 0 \leq \tau \leq 1 \quad (15)$$

In a fourth step 46 carried out for a "correction of the planar speed change", the values of the measured speed $v_{Fzg}$, of the steering angle $\delta_{lenk}$, of the angle $\theta_a$, $\phi_a$ and of the acceleration $\vec{a} - \vec{a}_{zf}$ and of the acceleration $\vec{a}_{zf}$ which are corrected with the central acceleration, are taken into consideration, wherein the corrected acceleration is corrected with the proportion of the change in the planar speed $\vec{a}_{vp,alt} = R\vec{v}_{alt}$. In order to avoid a negative feedback, the derivative of a vector of the speed $\vec{v}_{alt}$ is used instead of using the speed $\vec{v}_{Ebene}$ determined according to the calculation rule (15).

In a fifth step 48, while taking into consideration the rotational rate $\vec{\omega}$, the pitch angle $\vec{a}_{gv}$ of the vehicle 2, the pitch angle $\theta_a$ as well as the roll angle $\phi_a$, the inclination or the position of the superstructure 6 of the vehicle 2 are thus calculated with the inclination filter described above based on quaternions. The pitch angle $\theta_a$ as well as the roll angle $\phi_a$ are determined relative to the inertial coordinate system and they are then used in a closed control circuit for a "correction of the gravitational force" in the second step 42, as well as for a "correction of the planar speed change" in a third step 44.

Starting from the inclination of the superstructure 6 determined in the fifth step 48, the inclination and thus the position of the carriage way is determined, wherein the distances $\vec{dz}_a = [dz_{a,VL}, dz_{a,VR}, dz_{a,HL}, dz_{a,HR}]^T$ between the wheels 8, 10 and the superstructure are applied as measured variables, so that next, the pitch angle $\theta_a$ as well as the roll angle $\phi_a$ of the undercarriage of the vehicle 2 are calculated, wherein a calculation to be carried out is dependent on a transformation matrix (16):

$$T = \begin{bmatrix} l_v & l_v & -l_h & -l_h \\ t_v & -t_v & t_h & -t_h \end{bmatrix} \quad (16)$$

by means of which a geometrical position of the center of gravity 25 is described with respect to the positions of the wheel 8, 10. In this case, the first column describes the distance of the front left wheel 8, the second column describes the distance of the front right wheel, the third column describes the distance of the rear left wheel 10 and the fourth column describes the distance of the rear right wheel to the point of gravity 25 within the horizontal plane.

The inclination of the undercarriage is determined by means of the vectorial relationship $$\begin{bmatrix} \phi_f \\ \theta_f \end{bmatrix} = T\vec{dz}_a \quad (17)$$

By subtracting the inclination of the undercarriage from the inclination of the superstructure 6, the inclination of the carriageway 4 is calculated with respect to a coordinate system 24, which is fixed on the superstructure, via the vectorial relationship (18):

$$\begin{bmatrix} \phi_s \\ \theta_s \end{bmatrix} = \begin{bmatrix} \phi_a \\ \theta_a \end{bmatrix} - \begin{bmatrix} \phi_f \\ \theta_f \end{bmatrix} \quad (18)$$

Since the tire suspension of wheels 8, 10 is very small in comparison to a distance to be taken into consideration, this is neglected in the calculation above.

The angles $\theta_a$, $\phi_a$ are vector-related variables estimated for the inclination of the superstructure 6 and $\phi_s$ and $\theta_s$ describe the relative angles between the superstructure 6 and the surface of the carriageway 4, the angles are provided with $\phi s$ and $\theta s$ as estimated variables for the inclination of the carriageway 4 relative to the gravitational vector.

When the method is implemented, the active undercarriage of the vehicle 2 is to be compensated for with a correction of the superstructure 6 to obtain the inclination of the carriageway 4 and thus to horizontally level or to horizontally align the superstructure 6.

In this respect, it is to be determined with target values for a change of the length of the initiations 12, 14 to what extent should such a compensation should be undertaken for the inclination or horizontal leveling of the superstructure 6. For example, a stronger horizontal leveling is to be expected by adapting respective lengths of the actuators 12, 14 quantitatively to the target lengths while ascending or driving up a hill when compared to driving down a hill.

During an ascending drive, the superstructure 6 of the vehicle 2 is raised in the rear and lowered in the front, so that the view of the car occupants as well as their comfort is improved. During a descending drive, the superstructure 6 is raised in the front and lowered in the rear. However, a distinctly smaller compensation should be carried out for the inclination in this case not to impair the view of the car occupants and to ensure the ground clearance of the superstructure 6 with a transition from an ascending or descending slope to a horizontal position.

It is also conceivable to apply horizontal leveling transversely to the driving direction of the vehicle 2, wherein a compensation for the inclination of the superstructure 6 can be also limited in the transverse direction by presetting target values, for instance to prevent driving situations in which the ground clearance could be limited.

In order to implement the method, the calculated inclination angle of the carriage way $\phi s$ and $\theta s$ is at first limited with the specification of desired values or limiting values $\phi_{slim}$, $\theta_{slim}$.

$$\phi_{s,lim} = \begin{cases} \phi_{s,max} wenn \phi_s > \phi_{s,max} \\ \phi_{s,min} wenn \phi_s < \phi_{s,min} \\ \phi_s sonst \end{cases} \quad (19)$$

$$\theta_{s,lim} = \begin{cases} \theta_{s,max} wenn \theta_s > \theta_{s,max} \\ \theta_{s,min} wenn \theta_s < \theta_{s,min} \\ \theta_s sonst \end{cases} \quad (20)$$

[wenn = when, sonst = otherwise]

After that, the inclination angle $\phi s$, $\theta s$ is set to target values $\vec{z}_{akt}=[z_{akt,VL}, z_{akt,VR}, z_{akt,HL}, z_{akt,HR}]^T$ and recalculated in order to change the lengths of the actuators of the active undercarriage. A conversion of the limited pitch and of the roll angle of the carriageway 4 to the target values for the lengths of the actuators 20, 22 is carried out with the aid of the transformation matrix T and of known transmission ratios between actuator-related and wheel-related distances $$i_{VA} = \frac{z_{akt,VL}}{dz_{a,VL}} = \frac{z_{akt,VR}}{dz_{a,VR}} \text{ und } i_{HA} = \frac{z_{akt,HL}}{dz_{a,HL}} = \frac{z_{akt,HR}}{dz_{a,HR}}$$

for the front axis and for the rear axis of the vehicle 2, wherein a diagonal matrix diag($i_{VA},i_{VA},i_{HA},i_{HA}$) is built. In this case, for the actuator-related target values are used the following relationship with the transposed transformation matrix (16):

$$\vec{z}_{akt} = \text{diag}(i_{VA}, i_{VA}, i_{HA}, i_{HA}) T^T \begin{bmatrix} \phi_{s,lim} \\ \theta_{s,lim} \end{bmatrix} \quad (21)$$

In the formulas above, the maximum or minimum angles $\phi_{s,max}$, $\theta_{s,max}$, $\phi_{s,min}$ and $\theta_{s,min}$ and adjustable determining parameters or target values which depend on an individual driving situation can be changed.

The following output values are set in an application example:

$$i_{VA} = i_{HA} = 1; t_v = t_h = 0,5; l_v = l_h = 1,5 \quad (22)$$

$$\phi_{s,lim} = \frac{1}{180}\pi; \theta_{s,lim} = 0 \quad (23)$$

This results in:

$$\vec{z}_{akt}=[0,026 \; 0,026 \; -0,026 \; -0,026]^T \quad (24)$$

This means that the front actuators are moved by 2.6 cm upward and the rear actuators 20, 22, are moved by 2.6 cm downward, wherein the lengths of the respective actuators 20, 22 is changed according to the distances indicated here.

The vehicle 2 is shown schematically in FIG. 3a during an ascending travel on the carriageway 4, and during a normally horizontal travel on a carriageway which is schematically illustrated as being inclined laterally, transversely to the direction of the travel, for example in a steep curve. In addition, the illustration in FIG. 3a shows a wheel 54 of the vehicle 2 as the front right wheel and a wheel 56 as the rear right wheel. In this case, the wheel front right 54 is provided with an actuator 58 above it and connected with a suspension point of the superstructure 6 of the vehicle 2, while the wheel 56 is connected as the rear right wheel via an actuator 60 to a suspension point of the superstructure 6.

Referring to the illustration of FIG. 1, the wheel 54 has in the front on the right side the distance $dz_{a,VR}$ to the superstructure 6 and the distance $t_v$ to the center of gravity 25. The actuator 58, which is assigned to the front right wheel 54, has a distance to the superstructure 6 and a distance to the center of gravity 25. Accordingly, the rear right wheel 56 has a distance $dz_{a,HR}$ to a suspension point of the superstructure 6 and to the center of gravity 25 it has the distance of $t_h$. The actuator 60 assigned to the rear right wheel 56 has a distance to a suspension point of the superstructure 6 and it has a distance to the point of gravity 25 of the superstructure 6.

While taking into account the steps according to the invention described above, the actuators 14, 60 which connect the rear wheels 10, 56 on the rear axis of the motor vehicle 2 with its superstructure 6 are extended by a longer distance during an ascending travel of the vehicle in comparison to both actuators 12, 58, which connected the front wheels 8, 54 on the front axis of the vehicle with its superstructure 6. When traveling on a horizontally oriented carriageway, the lengths of the actuators 12, 14, 58, 60 are set to be the same. During a descending travel, the actuators 12, 58 which connect both front wheels 8, 54 with the superstructure 6 of the vehicle 2 are extended by a greater distance than the actuators 14, 60 of the wheels 10, 56 on the rear axis of the vehicle 2 which connect it to its superstructure 6. However, the extension of the actuators 12, 58 on the front axis is smaller relative to the actuators 14, 60 on the rear axis during a descending travel than the extension of the actuators 14, 60 relative to the actuators 12, 58 during an ascending travel.

When the vehicle 2 travels through a steep curve along the carriageway 4 illustrated in FIG. 3b, which is here inclined by way of an example to the left, both actuators 12, 14 assigned to both wheels 8, 10 on the left side of the vehicle 2 are with the carrying out of the method extended by a greater distance than both actuators 58, 60, which are assigned to both wheels 54, 56 on the right side of the vehicle 2. Should the vehicle 2 alternatively be traveling through a curve inclined to the right or through a steep curve along the carriageway 4, both actuators 58, 60 of the wheels 54, 56 on the right side of the vehicle 2 will conversely become more extended than the actuators 12, 14 of the wheels 8, 10 on the left side of the vehicle 2.

An adjustment or a compensation for the inclination of the superstructure 6 of the vehicle 2, which is again caused by an inclination of the carriageway 4, is carried out within the scope of the method in a first, low-frequency range. Regardless of an inclination of the carriageway 4, which relates to a complete surface of the carriageway 4, the carriageway can still have unevennesses which characterize the surface of the carriageway 4 only in some points. In addition to the compensation for the inclination, the changes from vertically oriented movements of the superstructure 6 of the vehicle 2, which are caused by similar unevennesses of the carriageway 4, are within the scope of the method compensated for in a second, higher frequency range.

In order to compensate for vertically oriented movements of the superstructure 6, the lengths of the actuators 12, 14, 58, 60 are changed depending on the frequency. For this purpose, frequency-dependent actuating signals are provided for the actuators by the control device 18, by means of which the lengths of the actuators 12, 14, 58, 60 are adjusted. The actuating signals are thus provided in this manner for horizontal leveling of the superstructure 6 based on the inclination of the carriageway 4, and actuating signals for compensation for vibrations of the superstructure 6 due to the unevennesses of the carriageway 4 are superimposed on each other depending on the frequency.

The relevant details can be obtained from FIG. 4, in which is schematically illustrated the control device 18 of the system 16 according to the invention.

This control device 18 comprises three regulators, in particular a basic controller 70, a predictive regulator 72, and a horizontal leveling regulator 74. In this case, a bandpass filter 76 is connected downstream of the basic controller 70 for carrying out bandpass filtering in the high frequency range. A bandpass filter 78 is also connected downstream of the predictive regulator 72 for carrying out bandpass filtering in the high frequency range. Moreover, a low-pass filter 80 is connected downstream of the horizontal leveling regulator 74 in the low frequency range for carrying low-pass filtering. In an alternative embodiment of the control device 18 it is eventually also possible to integrate the bandpass filter 78 in the predictive regulator 72. Accordingly, the low-pass filter 80 is to be integrated in horizontal leveling regulator 74.

Regardless of the concrete design of the control device 18, according to the embodiment of the method according to the invention, the first actuating signals which are provided in the high frequency range are provided by the basic controller 70 and by the bandpass filter 76, which is connected downstream of it in order to compensate for the unevennesses encountered while driving on the carriageway 4. In addition, actuating signals that are provided by the predictive regulator 72 and by the bandpass filter 78 connected downstream of it or integrated therein are also provided in the high frequency range to compensate for unevennesses encountered while driving on the carriageway 4. On the other hand, actuating signals that are provided independently of whether the low-pass filter 80 are integrated in the horizontal leveling regulator 74 or connected downstream from it, are provided by the horizontal leveling regulator 74 and by the low-pass filter 80 in the low frequency range for compensation of an inclination of the carriageway 4. In addition, the control device 18 comprises an addition module 88 to which are provided the actuating signal 82, 84 in the high frequency range, and the actuating signals 86 are provided in the low frequency range. The addition module 88 is designed to add together all of the signals 82, 84, 86 and to provide to a respective actuator 12, 14, 58, 60 an actuating signal 90 which comprises an addition and/or superposition of all of the actuating signals 82, 84, 86 regardless of the frequency. Based on such an actuating signal 90, a length of a respective actuator 12, 14, 58, 60 is changed or varied and thus adjusted both in the low frequency range and in the high frequency range, so that a compensation is provided by changing the length in the low frequency range, or an inclination of the carriageway 4 which is for example constructed as a street, and so that unevennesses of the carriageway 4 are compensated for by changing the length in the high frequency range.

In this case it is provided that the basic controller 70 is adjusted for example according to the skyhook algorithms. Instead of the basic controller 70, it is also possible to use any other regulator by means of which the unevennesses of the carriageway 4 can be compensated for.

A high profile of the carriageway 4 is detected in the direction of the travel of the motor vehicle 2 by a predictive sensor system, for example by a camera or a laser. The unevennesses detected in this manner are then proactively compensated for with the predictive regulator 74, wherein the lengths of the actuators 12, 14, 58, 60 are adjusted along the detected height profile.

The actuating signals 82, 84, 86 90 provided by said regulators comprise values for a length or for a travel path, or alternatively a force, for adjusting a respective actuator 12, 14, 58, 60, wherein the travel path or the force can be mutually converted into one another.

With the embodiment of the method described above, actuating signals 82, 84, 86, 90 are calculated, which initially contain, depending on the raw signals and a processing sequence, a wide frequency spectrum. To ensure that the different regulators will not negatively influence each other, the respective components of the signals are extracted by means of bandpass filters 76, 78 or high-pass filters or the low-pass filter 80, which are relevant to controlling the vehicle 2. So for example, travel paths calculated with the horizontal leveling regulator 74 can contain frequency portions above 0.5 Hz. However, within the scope of the method, such high frequencies are no longer reacted to, as a result of which an undesirable driving behavior is to be avoided. The skyhook algorithm for the basic controller 70 is, however, better suitable for these high frequencies than for frequencies below 0.5 Hz.

The invention claimed is:

1. A method for compensating for vertically oriented movements of a superstructure of a vehicle, wherein the vehicle is provided with the superstructure and with an active undercarriage having several wheels which are in contact with a carriageway, wherein each wheel is connected by means of an actuator which is adjustable over its length to a suspension point assigned to the each wheel with the superstructure, comprising:

causing the vertically oriented movements of the superstructure by at least one of an inclination of the carriageway and unevenness of the carriageway, performing a first change of the length of at least one actuator for compensating for the inclination of the carriageway for frequencies in a first, lower frequency range, which is limited by a first minimum frequency and a first maximum frequency, and performing a second change of the length of the at least one actuator for compensating for the unevenness of the carriageway for frequencies in a second, higher frequency range, which is limited by a second minimum frequency and a second maximum frequency, wherein when determining an inclination of the superstructure, a first coordinate system that is fixed to the superstructure is used, a second coordinate system that is fixed to the undercarriage is used in order to determine an inclination of the undercarriage, and wherein a third inertial coordinate system is used as a reference coordinate system which is related to a gravitational force.

2. The method according to claim 1, wherein the first maximum frequency is lower than the second minimum frequency for frequency ranges that are separate.

3. The method according to claim 1, wherein the first maximum frequency is higher than the second minimum frequency.

4. The method according to claim 1, wherein the first minimum frequency is 0 Hz and the first maximum frequency is 1 Hz.

5. The method according to claim 1, wherein the second minimum frequency is at least 0.1 Hz, maximum 1 Hz, and the second maximum frequency is at least 0.1 Hz, maximum 20 Hz.

6. The method according to claim 1, wherein at least one minimum frequency and at least one maximum frequency is adapted to a corner frequency or the limiting frequency of at least one of the actuators.

7. The method according to claim 1, wherein inclination actuating signals are provided for a respective actuator for control and for compensation in the lower frequency range, and actuating signals are provided for compensating for unevenness in the higher frequency range, and are added in the higher frequency range to an actuating signal.

8. The method according to claim 1, wherein an inclination of the superstructure is determined in at least one spatial direction, wherein a vertical distance to an associated suspension point of the superstructure is determined for at least one wheel, wherein by at least one determined distance, an inclination of the undercarriage is calculated in the at least one spatial direction with a transformation of the vertical distance of the at least one wheel to the superstructure with a transformation matrix $$T = \begin{bmatrix} l_v & l_v & -l_h & -l_h \\ t_v & -t_v & t_h & -t_h \end{bmatrix}$$

wherein the inclination of the carriageway is determined in at least one spatial direction from a difference of the superstructure in the at least one spatial direction, and the inclination of the undercarriage is determined in the at least one spatial direction, wherein each respective value for at least one angle $\phi_s$, $\theta_s$ about which the carriageway is inclined is determined in at least one spatial direction, wherein a respective limiting value $\phi_{s,lim}$, $\theta_{s,lim}$ is specified for the value of at least one angle $\phi_s$, $\theta_s$, wherein transmission ratios $i_{VA}$, $i_{HA}$ for a distance of at least one actuator relative to the superstructure are taken into consideration, and wherein a target value for a change of the length of at least one actuator is determined by $$\vec{z}_{akt} = \mathrm{diag}(i_{VA}, i_{VA}, i_{HA}, i_{HA}) T^T \begin{bmatrix} \phi_{s,lim} \\ \theta_{s,lim} \end{bmatrix}.$$

9. The method according to claim 8, wherein the inclination of the carriageway in the at least one spatial direction is determined by the transformation of the vertical distance of the at least one wheel to a center of gravity of the superstructure with the transformation matrix $$T = \begin{bmatrix} l_v & l_v & -l_h & -l_h \\ t_v & -t_v & t_h & -t_h \end{bmatrix}$$

wherein a front, longitudinal distance $I_v$ describes a distance of a respective front wheel from a center of gravity of the superstructure in the longitudinal spatial direction, a rear, longitudinal distance $I_h$ describes the distance of a respective rear wheel from the center of gravity in the longitudinal spatial direction, a front, transversal distance $t_v$, describes the distance of the front wheel from the center of gravity in the transversal spatial direction and a rear, transversal distance to describes the distance of the rear wheel from the center of gravity in the transversal spatial direction.

10. The method according to claim 8, wherein the transmission ratios $i_{VA}$, $i_{HA}$ are determined over a distance of a respective actuator from the center of gravity of the superstructure and of a respective wheel from the center of gravity of the superstructure.

11. The method according to claim 8, wherein a negative pitch angle $\theta_s$ is determined when an ascending slope is present, and a positive pitch angle $\theta_s$ is determined when a descending slope is present.

12. The method according to claim 8, wherein the respective limiting values $\phi_{s,lim}$, $\theta_{s,lim}$ for the value of at least one angle $\phi_s$, $\theta_s$ are determined by $$\phi_{s,lim} = \begin{cases} \phi_{s,max} & \text{when } \phi_s > \phi_{s,max} \\ \phi_{s,min} & \text{when } \phi_s < \phi_{s,min} \\ \phi_s & \text{otherwise} \end{cases}$$

$$\theta_{s,lim} = \begin{cases} \theta_{s,max} & \text{when } \theta_s > \theta_{s,max} \\ \theta_{s,min} & \text{when } \theta_s < \theta_{s,min} \\ \theta_s & \text{otherwise} \end{cases}.$$

13. The method according to claim 12, wherein an amount of $\theta_{s,min}$ is selected in the case of an ascending slope to be greater than an amount of $\theta_{s,max}$ in the case of a descending slope.

14. The method according to the claim 1, wherein the inclination of the superstructure is described with reference to the reference coordinate system by means of a quaternion.

15. The method according to claim 1, wherein a strap-down algorithm is used so that in order to determine a corrected acceleration of the vehicle, an acceleration measured by a system of sensors is corrected with a centrifugal acceleration and a gravitational correction and a speed of the vehicle is determined in a plane, and the inclination of the superstructure is calculated.

16. The method according to claim 1, wherein the vibrations that occur when driving over unevenness are compensated for with an algorithm for a continuous damping control in the second higher frequency range.

17. A system for compensating for an inclination of a vehicle in at least one spatial direction, comprising:
a superstructure and with an active undercarriage having a plurality of wheels that are in contact with a carriageway, wherein the system is equipped with a plurality of sensors and with a control device, wherein each wheel is connected over its length with an adjustable actuator to the superstructure at a suspension point associated with one of the wheels, wherein vertically oriented movements of the superstructure are caused by an inclination of the carriageway and by unevenness of the carriageway, wherein the control device is designed to provide actuating signals to the actuators and to control their length, wherein a first change of the length of at least one actuator for compensation of the inclination of the carriageway is to be carried out for frequencies in a first, lower frequency range, which is limited by a first minimum frequency and by a first maximum frequency, and wherein a second change of the length of the at least one actuator for compensation for unevenness of the carriageway for frequencies in a second, higher frequency range is to be carried out in a second, higher frequency range that is limited by a second minimum frequency and a second maximum frequency, wherein the control device is provided with a horizontal leveling regulator provided with a low-pass filter connected downstream, which is designed to provide actuating signals in the low frequency range.

18. The system according to claim 17, wherein at least a first sensor is designed to determine an inclination of the superstructure in at least one spatial direction, wherein at least one second sensor is designed to detect at least in one vertical distance the suspension point of the superstructure assigned to it, wherein the control device is designed to calculate over the at least one determined distance an inclination of the undercarriage in the at least one spatial direction with a transformation of the vertical distance of the at least one wheel to the superstructure with a transformation matrix $$T = \begin{bmatrix} l_v & l_v & -l_h & -l_h \\ t_v & -t_v & t_h & -t_h \end{bmatrix}$$

wherein the control device is designed to determine the inclination of the carriageway in the at least one spatial direction from the difference of the inclination of the superstructure in the at least one direction, as well as the inclination of the undercarriage in the at least one spatial direction and a respective value for at least on angle $\phi_s$, $\theta_s$ about which the carriageway is inclined in at least one direction, wherein a respective limiting value $\phi_{s,lim}$, $\theta_{s,lim}$ is preset for the value of at least one angle $\phi_s$, $\theta_s$, wherein the control device is adapted to take into account transmission ratios $i_{VA}$, $i_{HA}$ for a distance of the at least one actuator with respect to the superstructure and for a distance of the at least one wheel with respect to the superstructure, wherein the control device is adapted to determine a target value for a change of a length of at least one actuator with:

$$\overrightarrow{z_{akt}} = \text{diag}(i_{VA}, i_{VA}, i_{HA}, i_{HA}) T^T \begin{bmatrix} \phi_{s,lim} \\ \theta_{s,lim} \end{bmatrix}.$$

19. The system according to the claim 17, wherein at least one second sensor is designed as a distance sensor.

20. The system according to claim 17, wherein the control device is provided with a basic controller, which is designed to provide actuating signals in the high frequency range.

21. The system according to claim 17, wherein the control device is provided with a predictive regulator provided with a low-pass filter connected downstream, which is designed to provide actuating signals in the high frequency range.

* * * * *